United States Patent
Nikitin et al.

(10) Patent No.: US 12,340,239 B2
(45) Date of Patent: Jun. 24, 2025

(54) METHOD AND SYSTEM FOR APPLICATION PROGRAMMING INTERFACE BASED CONTAINER SERVICE FOR SUPPORTING MULTIPLE MACHINE LEARNING APPLICATIONS

(71) Applicant: Salesforce, Inc., San Francisco, CA (US)

(72) Inventors: Alexandr Nikitin, El Sobrante, CA (US); Vaibhav Gumashta, San Francisco, CA (US); Manoj Agarwal, Cupertino, CA (US); Swaminathan Sundaramurthy, Los Altos, CA (US)

(73) Assignee: Salesforce, Inc., San Francisco, CA (US)

( * ) Notice: Subject to any disclaimer, the term of this patent is extended or adjusted under 35 U.S.C. 154(b) by 1058 days.

(21) Appl. No.: 17/337,389

(22) Filed: Jun. 2, 2021

(65) Prior Publication Data

US 2022/0391748 A1 Dec. 8, 2022

(51) Int. Cl.
*G06N 20/00* (2019.01)
*G06F 9/455* (2018.01)

(52) U.S. Cl.
CPC .......... *G06F 9/45558* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 10,831,519 B2* | 11/2020 | Faulhaber, Jr. | G06N 20/00 |
| 10,853,124 B2* | 12/2020 | Ago | G06F 21/604 |
| 11,106,560 B2* | 8/2021 | Vijendra | G06F 11/3024 |
| 11,257,002 B2* | 2/2022 | Faulhaber, Jr. | G06N 3/08 |
| 11,341,339 B1* | 5/2022 | Li | G06F 40/40 |
| 11,373,119 B1* | 6/2022 | Doshi | H04L 47/70 |
| 11,720,813 B2* | 8/2023 | Babu | G06N 20/20 |
| | | | 706/12 |

(Continued)

OTHER PUBLICATIONS

Automl.org, "AutoML . . . ", AutoML.org: Freiburg-Hannover, Available Online at <https://www.automl.org>, retrieved on Mar. 9, 2021, 1 page.

(Continued)

*Primary Examiner* — Van H Nguyen
(74) *Attorney, Agent, or Firm* — Nicholson De Vos Webster & Elliott LLP

(57) ABSTRACT

A method and system for an application programming interface (API) based container service for supporting multiple machine learning (ML) applications is described. In particular, a scoring service container includes a base scorer to interface with a ML serving infrastructure using the API. The scoring service container also includes an application specific scorer, which itself includes a model loader and a scoring function. A model identifier is provided to the model loader, and it provides a model object. At least some parameters in a request from a client application are passed to scoring function, which produces a scoring. The base scorer returns the scoring according to the API to the ML serving infrastructure for delivery to the client application.

21 Claims, 5 Drawing Sheets

(56) References Cited

U.S. PATENT DOCUMENTS

| | | | |
|---|---|---|---|
| 11,966,396 B1* | 4/2024 | Finnerty | G06F 16/2433 |
| 12,045,693 B2* | 7/2024 | Swan | G06F 9/45558 |
| 12,073,258 B2* | 8/2024 | Feldman | G06N 20/00 |
| 12,147,878 B2* | 11/2024 | Balasubramanian | G06V 10/776 |
| 2019/0102700 A1* | 4/2019 | Babu | G06N 20/00 |
| 2020/0097662 A1* | 3/2020 | Hufsmith | H04L 9/0643 |
| 2021/0326717 A1* | 10/2021 | Mueller | G06Q 10/06 |
| 2022/0237505 A1* | 7/2022 | Feldman | G06F 9/45558 |
| 2022/0237506 A1* | 7/2022 | Feldman | G06F 9/45558 |
| 2022/0318647 A1 | 10/2022 | Ashrafzadeh et al. | |
| 2022/0382539 A1 | 12/2022 | Gumashta et al. | |
| 2022/0382601 A1 | 12/2022 | Feldman et al. | |
| 2022/0391199 A1 | 12/2022 | Ashrafzadeh et al. | |
| 2022/0391239 A1 | 12/2022 | Feldman et al. | |
| 2022/0391747 A1 | 12/2022 | Ashrafzadeh et al. | |
| 2022/0391749 A1 | 12/2022 | Feldman et al. | |

OTHER PUBLICATIONS

Microsoft Research, "AutoML", Available Online at <https://www.microsoft.com/en-us/research/project/automl/>, retrieved on Mar. 9, 2021, 2 pages.

Nabar, Shubha, "Open Sourcing TransmogrifAI: Automated Machine Learning for Structured Data", Available Online at <https://engineering.salesforce.com/open-sourcing-transmogrifai-4e5d0e098da2>, Aug. 16, 2018, 10 pages.

* cited by examiner

METHOD AND SYSTEM FOR APPLICATION PROGRAMMING INTERFACE BASED CONTAINER SERVICE FOR SUPPORTING MULTIPLE MACHINE LEARNING APPLICATIONS

TECHNICAL FIELD

One or more implementations relate to the field of container management; and more specifically, to a process and system for supporting application specific code in containers by implementing an application programming interface based container service.

BACKGROUND ART

Containers are a logical packaging in which applications can execute that is abstracted from the underlying execution environment (e.g., the underlying operating system and hardware). Applications that are containerized can be quickly deployed to many target environments including data centers, cloud architectures, or individual workstations. The containerized applications do not have to be adapted to execute in these different execution environments as long as the execution environment support containerization. The logical packaging includes a library and similar dependencies that the containerized application needs to execute.

However, containers do not include the virtualization of the hardware of an operating system. The execution environments that support containers include an operating system kernel that enables the existence of multiple isolated user-space instances. Each of these instances is a container. Containers can also be referred to as partitions, virtualization engines, virtual kernels, jails, or similar terms.

Machine learning is a type of artificial intelligence that involves algorithms that build a model based on sample data. This sample data is referred to as training data. The trained models can generate predictions, a process also referred to as scoring, based on new data that is evaluated by or input into the model. In this way, machine learning models can be developed for use in many applications without having to be explicitly programmed for these uses.

Containers can be used in connection with machine-learning serving infrastructure. Machine-learning serving infrastructures enable the execution of machine-learning models and provide services to the machine-learning models. Each machine-learning model can be separately containerized with all its required dependencies.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for a process and system for supporting application specific code in containers by implementing a standardized container service. The example implementations provide a method and system of serving machine learning (ML) models that support application specific code. The method and system can be referred to as a 'Bring Your Own Container (BYOC)' method and system. The example implementations enable ML model developers to customize serving containers for the models. The example implementations raise the integration point of the ML models and container from a code level to an application programming interface (API) level (e.g., a Web API level). Instead of implementing a code interface, ML model developers implement an entire container for the ML model. In some examples, the container can be implemented with hyper-text transfer protocol (HTTP) web service and dependencies incorporated into the container. At the same time, the developers of the ML model can be assured that the container can be successfully deployed to ML serving infrastructure without significant investment of development time and manpower.

Where ML models are utilized in support of applications, there are a wide variety of variety of ML frameworks or libraries (e.g., TransmogrifAI/SparkML Lib, TensorFlow, XGBoost), APIs (HTTP/gRPC, Java interface), programming languages (Java, Python), and related technologies that can be employed any combination. There can be multiple groups that are creating ML models that will be deployed in the same ML serving infrastructure such as in the case where the ML serving infrastructure supports multi-tenancy. The ML models can have different requirements, use cases, and needs. Hence there can be multiple ways to integrate ML models and serve them.

As used herein, an application can be any program or software to perform a set of tasks or operations. A 'set,' as used herein includes any positive whole number of items including a single item. A machine-learning model can be a set of algorithms and statistical data structures that can be trained to perform a specific task by identifying patterns and employing inference instead of using explicit instructions. The machine-learning model can be trained for the task using a set of training data.

Machine-learning serving infrastructure can be automated and organized to support multi-tenancy where containers can be used to execute the ML models that can service the applications and users of tenants in a multi-tenant system. Within a muititenant system, a software application is designed to provide each tenant with a tenant-specific view of the application including access only to tenant-specific data, configuration, user management, and similar tenant properties and functionality. A tenant can be a group of users who are part of a common organization or share common access privileges to the multi-tenant system and the associated software applications.

Figure 1:
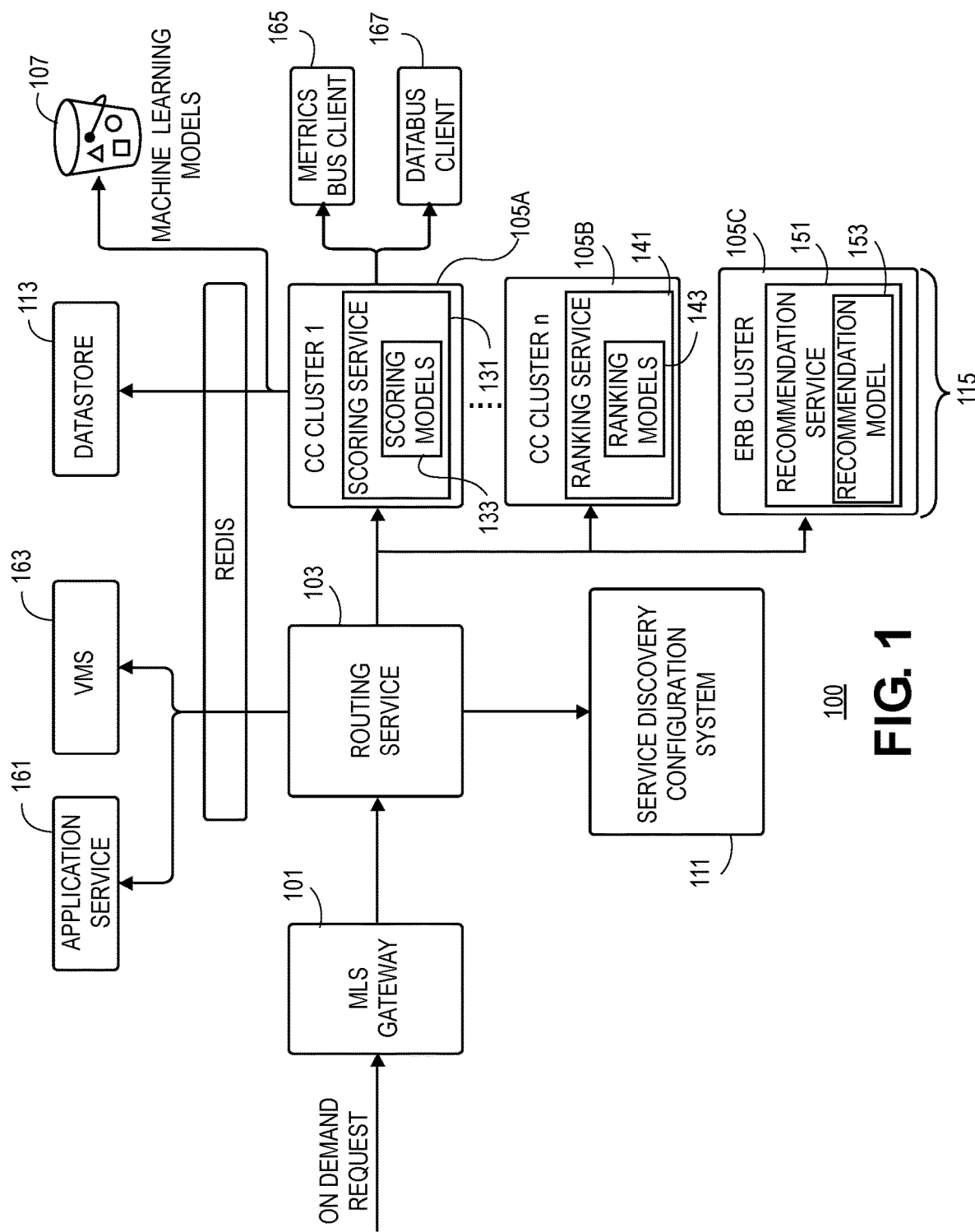
FIG. 1 is a diagram of one example implementation of a machine-learning serving infrastructure that supports a multi-tenant system.

FIG. 1 is a diagram of one example implementation of an ML serving infrastructure that supports a multi-tenant system. The machine-learning serving infrastructure 100 includes a machine-learning service (MLS) gateway 101, routing service 103, set of serving containers 115, and data stores 107, 113, along with other supporting infrastructure.

A serving container (e.g., 105A-C) can be an isolated execution environment that is enabled by an underlying operating system, and which executes the main functionality of a program such as an ML model. A serving container 115 can host any number of ML models for any number of tenants. Serving containers 115 can be organized as a cluster. The cluster can be a group of similar entities, such that a cluster of serving containers can be a group of serving container instances or similar grouping. An ML serving infrastructure 100 can host any number of serving containers 115 or clusters of serving containers. Different clusters can host different versions or types of ML models.

In some example implementations, a cluster of serving containers 115 can host all ML models of the same version for all tenants. This organization of the cluster can be limited by the number of ML models that a single-serving container can hold. The ML serving infrastructure 100 can scale to accommodate further additions of ML models even in cases where the number or variety of ML models exceed the capacity of the serving containers 115 in the cluster. Since each ML model's size, which can range from hundreds of kilobytes (KB) to hundreds of megabytes (MB), initialization time, and the number of requests that are serviced, can vary widely based on each tenant's underlying database and usage, some clusters of serving containers 115 may have a high resource usage, while other clusters of serving containers 115 may have a low resource utilization. The resource usage, failure, or addition of any server container in a cluster of serving containers can create the need to rebalance the supporting resources in the clusters of serving containers. When changes in the number or resource usage of the serving containers 115 are implemented, then the routing service 103 can manage the load balancing and routing of requests according to the changes in the organization of the serving containers.

A routing service 103 can be implemented as a set of routing containers, or cluster of routing containers, each implementing instances of the routing service 103 functions or subsets of these functions. The routing service 103 can authenticate any request from any tenant, and then route the request for service by ML models to any serving container 115 in a cluster of serving containers.

The ML serving infrastructure 100 receives requests from tenants via a machine-learning service (MLS) gateway 101 or a similar interface. The MLS gateway 101 or similar interface receives a request from a tenant application and identifies a version or instance of an ML model associated with the request. The MLS gateway 101 or similar interface identifies model information associated with ML models corresponding to a cluster of available serving containers associated with the version of the ML model. The MLS gateway 101 uses the model information to select a serving container from the cluster of available serving containers. If the ML model is not loaded in the serving container, the machine-learning serving infrastructure 100 loads the ML model in the serving container. If the ML model is loaded in the serving container, the system executes, in the serving container (e.g., 105A-C), the ML model (e.g., the scoring models 133) on behalf of the request. The ML serving infrastructure 100 responds to the request based on executing the appropriate ML model on behalf of the request.

In one example, the ML serving infrastructure 100 receives a request for scoring a business opportunity from a Customer Relationship Management (CRM) application and identifies the request requires executing a version of a particular opportunity scoring ML model 133. The routing service 103 identifies ML model information including memory and CPU requirements for the scoring ML models 133 in the cluster of scoring serving containers. The routings service 103 applies a load balancing algorithm, resource management algorithm (e.g., a multi-dimensional bin-packing algorithm) to the collected model information to select the serving container 115 that has the best combination of available resources to execute a copy of the specific ML model associated with an incoming request.

If a copy of the specific ML model needed to service the incoming request is not already loaded in a serving container 115, then an existing or new serving container loads the required ML model. When a copy of the specific ML model is verified to be loaded in the serving container, then the specific ML model executes the requested service or function, as specified in the received request, in the serving container. A score or similar prediction is thereby generated by the ML model and the ML serving infrastructure 100 can then respond to the request with the generated score via the MLS gateway 101.

The ML serving infrastructure 100 can be implemented in a cloud computing environment in which data, applications, services, and other resources are stored and delivered through shared data centers. The ML serving infrastructure 100 can be implemented via any other type of distributed computer network environment in which a set of servers control the storage and distribution of resources and services for different client users.

The clusters 105A-C of the example implementation of the ML serving infrastructure 100 can be two of any number of clusters that are serving containers for scoring services 131. Where a scoring service 131 can be a serving container for any number of ML models that perform scoring, i.e., scoring models 133. Each cluster 105A-C can execute different sets of scoring services (e.g., different serving containers) for executing different varieties of machine-learning models (e.g., scoring models 133). An incoming request can be serviced by a single ML model of a single cluster (e.g., a scoring model 133 of a given scoring service 131) or the incoming request can be sub-divided to be serviced by multiple dusters, service containers, and ML models. In some implementations, the clusters 105A-C and serving containers operate other similar types of ML models other than scoring ML models such as ranking and recommendation models. Scoring is provided as an example rather than by limitation. The clusters 115 can include in some implementations ranking services 141 and recommendation services 151, which support ranking models 143 and recommendation models 153, respectively.

In some implementations, the routing service 103 can split the incoming request into separate sub-requests, and then route the sub-requests to their corresponding clusters 105A-C of serving containers. Although these examples describe the clusters 115 of serving containers that serve one version of the scoring type of ML models, one version of the recommending type of ML models, and one version of the ranking type of machine-learning models, any clusters of any serving containers may serve any number of versions of any number of any types of any ML models and all permutations thereof.

In some implementations, each of the serving containers 115 registers with service discovery and configuration system 111 by providing the serving container's registration information, such as the host, the port, functions, or similar information. When any of the serving containers 115 is no longer available or becomes unavailable, the discovery and configuration system 111 deletes the unavailable serving container's registration information. An available serving container 115 can be referred to as an actual serving container.

The discovery and configuration system 111 can be implemented by HashiCorp Consul, Apache Zookeeper, Cloud Native Computing Foundation etcd, Netflix eureka, or any similar tool that provides service discovery and/or a service registration system. The discovery and configuration system 111 can track container information about each serving container and model information about each serving container's machine-learning models. In other implementations, this information can be stored in other locations such as datastore 113 using a format or organization. Container information can be data about an isolated execution environment, which executes the main functionality of an ML model. Model information can be data about the algorithms and/or statistical models that perform a specific task effectively by relying on patterns and inference instead of using explicit instructions.

The routing service 103 can be deployed with multiple redundant and/or distributed instances so that it is not a single point of failure for the ML serving infrastructure 100. In some implementations, one instance of the routing service 103 acts as a master, while other instances of the routing service 103 are in a hot standby mode, ready to take over if the master instance of the routing manager fails, or perform some operations at the direction of the master instance.

The routing service 103 makes decisions to load, rebalance, delete, distribute, and replicate ML models in the serving containers 115. These decisions can be based on the information provided to the routing service 103 by the serving containers 115 and other elements of the ML serving infrastructure 100. The data model information in the discovery and configuration system 111 provides information about which serving containers are expected to host-specific ML models and which serving containers actually host the specified ML models. The routing service 103 can also send a list of expected ML models to a model mapping structure in the discovery and configuration system 111. Each of the serving containers 115 can manage a list of executing ML models. If the serving container list does not match the list of expected ML models that a serving container receives, the serving container can load or delete any ML models as needed, and then update its list of executing ML models accordingly. The routing service 103 can monitor and maintain each serving container's list of actual ML models to determine where to route requests.

The routing service 103 can analyze the model information about each ML model to decide whether to replicate frequently used ML models to additional serving containers to prevent overloading the serving containers which are hosting the frequently used ML models. The routing service 103 can use the data model information of the service discovery and configuration system 111 to manage lists of available ML models and available serving containers. Every time an ML model is loaded, the serving container registers the ML model in the data model information. Therefore, the routing service 103 can route requests for a particular ML model to the serving containers.

When any of the executing serving containers 115 in any of the executing clusters of serving containers dies unexpectedly, or gracefully, the serving container's heartbeat to the service discovery and configuration system 111 fails. The ML serving infrastructure 100 removes the data for the failed serving container from its directory, files, or similar data structures in the service discovery and configuration system 111. Based on a review of overall resource usage amongst the serving containers 115, the routing service 103 can respond by rebalancing the serving containers 115 in terms of assigned ML models.

When requests are received by the routing service 103 via the MLS gateway 101, a check of the mapping is made to determine if a requested ML model is executing using the service discovery and configuration system 111. If found, then the routing service 101 can forward the requests (or divide the request into a set of sub-requests) to the identified serving containers 115. If a ML model for the request is not found, then the routing service 103 can load the ML model from a datastore 113, specialized database, or store 107 (e.g., a simple storage service (S3)), or similar location into a selected cluster and serving container.

In some implementations, the ML serving infrastructure 100 can include any number of additional supporting features and functions. These additional supporting features and functions can include application services 161, version management services (VMS) 163, redistribution services, and similar functions and services. The application services 161 can be any number, combination, and variety of functions and services for supporting tenant applications and the ML serving infrastructure 100. The VMS 163 can be any number, combination, and variety of functions and services for supporting different versions of ML frameworks, ML models, and similar components of the machine-learning serving infrastructure 100. The redistribution services can be any number, combination, and variety of interconnecting services to enable communication between the components of the ML serving infrastructure 100 and supporting components. In some example implementations, serving containers can interface with or support metrics bus clients 165, databus clients 167, and similar components. The metrics bus clients 165 can be services that gather or monitor metrics of the serving containers 115 and similar aspects of the ML serving infrastructure 100. Similarly, the databus clients 167 can be services and functions that enable data communication and access between the serving containers 115 and other components of the ML serving infrastructure 100.

The example implementations can define a public API that provides an interface and contract for developers to utilize for implementing containers for the ML models they are designing. The public API draws clear boundaries between systems and contexts. The API is visible outside of the execution environment, and is an "entry point" to the system. The API is lifted above implementation specifics and encapsulates. The example implementations are Web API level (BYOC) and referred to herein as the BYOC API where developers can implement a container (e.g., a scoring service container) with application specific code and a set of application specific ML models associated therewith.

The method and system of the example implementations have advantages over the art. The method and system give more freedom to ML modeling developer teams, support different developer team needs (e.g., use Python vs Java, TMOG/SparkML vs TensorFlow/PyTorch, complex pipelines), support scalability with ability to manage more products and algorithms, and provides a language agnostic interface. The BYOC API of the example implementations is general and flexible. Requests and responses can take any type and form (Avro/Protobuf/binary). The BYOC API of the example implementations is not limiting and can use multiple protocols (HTTP/gRPC/).

The example implementations utilize the BYOC API in connection with developer created containers. The developer created containers execute at the same level as other containers (e.g., Scoring and ERB containers). Each developer created container is responsible for implementing the functions and interfaces of the BYOC API to score a request, and return the response to the requestor. The requestor can be a client application that can be associated with a specific set of scoring service containers having client application specific code. The client applications can also be associated with a specific set of ML models that are loaded and executed by this set of scoring service containers. The developers generate all of the code in these containers, so they can be implemented with Java, Python, or any other language. The developer implemented container using the BYOC API is the contract that ML model developer implemented containers must follow to be used with the ML serving infrastructure.

Figure 2:
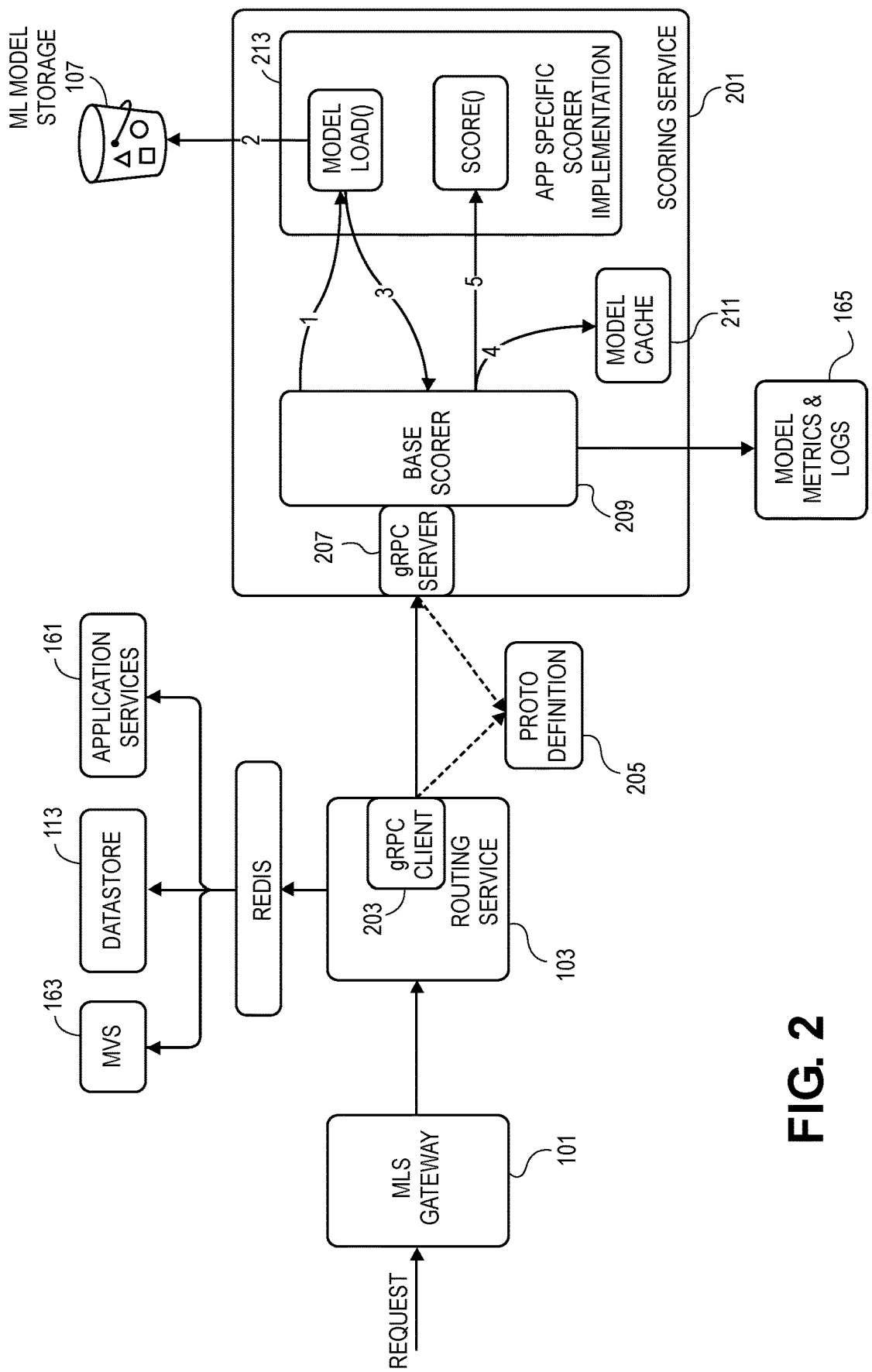
FIG. 2 is a diagram of one example implementation of a scoring service in the machine-learning serving infrastructure.

FIG. 2 is a diagram of one example implementation of a scoring service in the machine-learning serving infrastructure. The diagram illustrates a developer created container that implements the BYOC API. The routing service will query the BYOC API to request a prediction on a particular developer defined ML model in a developer created container. Each developer created container can have its own logic for how requests are passed to a scoring service 201 that is a developer created container. The requests are received via the MLS gateway 101 and routing service 103, which identify the scoring service 201 that will process the received request using the associated ML model, which is retrieved from the ML model storage 107 if not already executing.

The developer created containers define how the received requests are processed by implementing function calls of the BYOC API that determine how the fields of the received requests are processed (e.g., reformatted for use of the ML model). The requests can identify the ML model and associated servicing container 201 to utilize using a uniform resource identifier or similar identifier. The developer created container implementing the BYOC API can support the container serving multiple ML models. The developer created container that implements the BYOC API can dynamically load the ML models from an ML mode store 107. The ML models can be a part of the container image or separately loaded to make it easier to deploy new or updated ML models.

Each container that implements the BYOC API can support versioning. Each container should have a version where the version can have any format. The format can be a MAJOR.MINOR.PATCH (e.g., 2.0.1) format. The major number is incremented for breaking changes, the minor for non-breaking. These version numbers can be used in the routing service 103. Any number and variety of versions for each container can be supported at a time via the VMS 163 or similar service (e.g., a model versioning service (MVS)). In some implementations the number or variety of versions can be capped at any level to minimize the number of simultaneous containers that the ML serving infrastructure needs to support.

Any container that meets the set of requirements defined by the BYOC API will be supported by the ML serving infrastructure. However, it will be a large undertaking for every model developing team to create their own container from scratch. Therefore, a base implementation of a container that conforms with the BYOC API can be provided that a model development team can use or adapt for their purposes. This base container can be written in any language or using any technology. In one example implementation, the base container is written for the Flask web framework, behind a WSGI proxy which will allow scalability. The example base container can support caching with Python annotations, and be able to fetch objects from the model storage (e.g., s3). This will allow a shorter time to production for most common use cases, while leaving flexibility for uncommon use cases.

End-to-end performance of service containers and ML models in the ML serving infrastructure highly depends on underlying implementation of the servicing container that is compliant with the BYOC API. Access patterns and performance requirements (QPS, latency, payload) vary from use case to use case. The overhead for the example implementations can be less than 100 ms extra overhead. One of the ways to manage the overhead is to have defined service level agreements (SLAs) and performance tests for developer created containers.

The ML servicing infrastructure can provide observability means for modeling teams including metrics (collecting various metrics such as QPS, latency, responses with errors, and similar metrics), dashboards (for the metrics collected), alerts (based on SLAs and metrics), logs (provided with trace-id), distributed tracing, and similar capabilities. In addition to the SLAs defined for each container, the ML serving infrastructure can have an SLA for the service as a whole with no more than 100 ms extra overhead added by routing, so each prediction has a latency SLA of <1 s.

As shown in FIG. 2 a scoring service 201 is shown in the context of the ML serving infrastructure. A single scoring service 201 is shown by way of illustration for sake of clarity and conciseness. One skilled in the art would understand that any number and variety of containers can be supported as shown in FIG. 1. The scoring service 201 is a container that conforms to the BYOC API requirements. The scoring service 201 can be called using any protocol to pass a request to the scoring service 201 to be processed by an ML model via the application specific scorer implementation 213, which is the developer provided code that utilizes the developer implemented ML model to be applied to the received request. The received request will have specified the scoring container 201 and/or ML model to service the received request. In some cases, the same developer or a related developer generated the requestor and the scoring service container 201 and/or the ML model. In response to receiving the request the routing service will inspect the request to identify the scoring service 201 to which the request is to be routed.

The routing service can then call the scoring service 201 via a local client (e.g., a remote procedure call (RPC) client such as gRPC client 203). The gRPC server 207 or similar server at the scoring service 201 then services the call from the gRPC client 203. The interface between the gRPC client 203 and gRPC server 207 or similar protocol components can be defined via a shared proto definition 205 or similar mechanism that can be provided by the developer of the scoring service 201. The gRPC server 207 can then pass the parameters of the request to the base scorer 209 of the scoring service 201. The base scorer 207 can call a model load function (1) of the application specific scorer implementation 213 to ensure that the requested model is loaded or in response to detecting that the requested model is not loaded. In cases where a base container is utilized the components of the scoring service 201 other than the application specific scorer implementation 213 are provided by the base container. This enables the developer to focus on the core logic and operation of the ML model.

If the ML model is not already loaded, then the model load function loads (2) the identified ML model (e.g., the ML model is identified in the request and the identifier passed to the scoring service 201). A confirmation of the load (3) is then sent to the base scorer 209. The base scorer 209 can store or instruct that that the loaded model is stored in the model cache 211. The base scorer 209 then passes parameters of the received request to the score function (5) for the application specific scorer implementation 213 to apply to the loaded ML model. The result of the score is returned to the base scorer, which in turn returns the result to the routing service 103 and thereby the requestor. The base scorer 209 can monitor the operation of the scoring service 201, application specific scorer implementation 201, the loaded ML models, and similar aspects to report metrics and generate logs 165.

Figure 3:
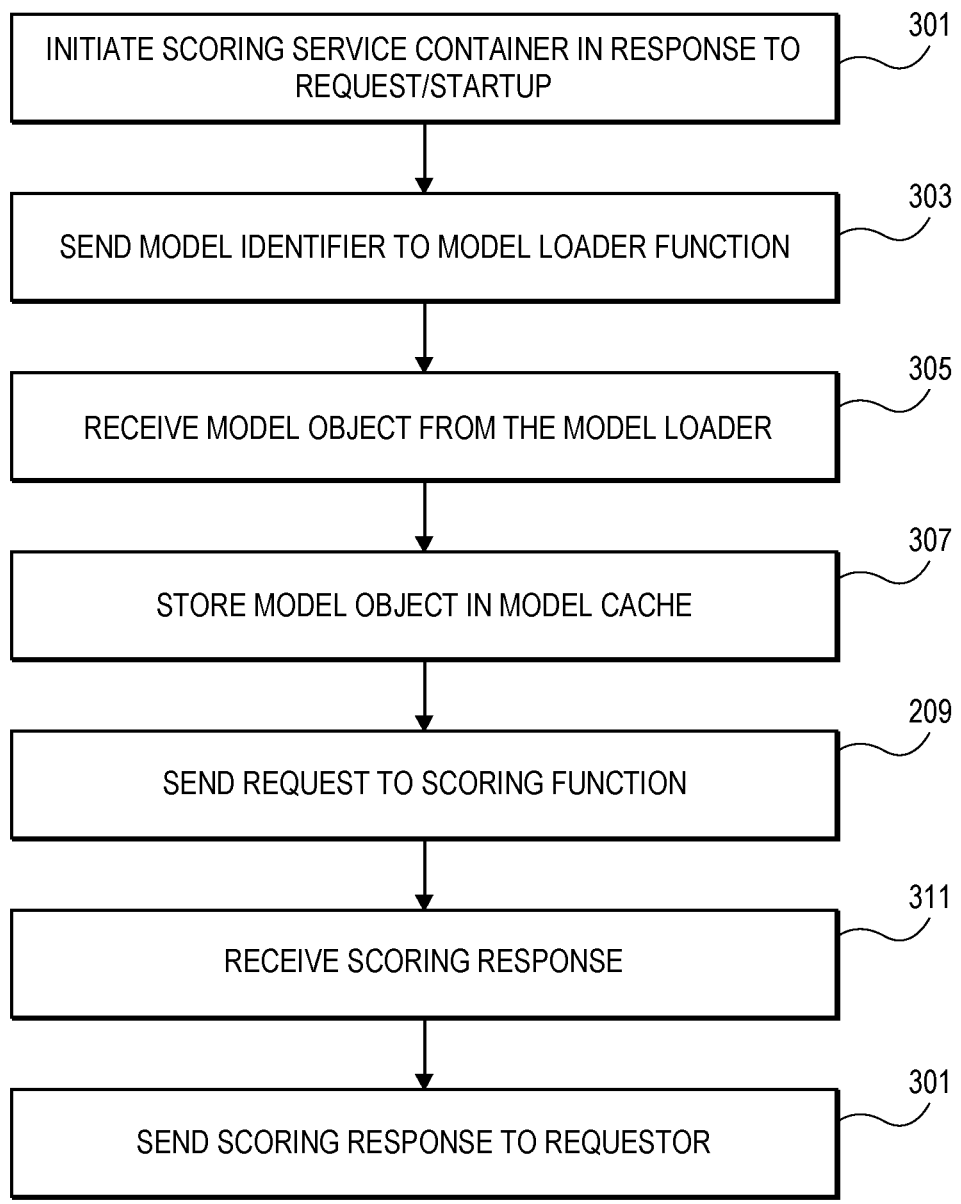
FIG. 3 is a flowchart of one example implementation of a process of a standardized scoring service that supports application specific scoring functions.

FIG. 3 is a flowchart of one example implementation of a process of a developer created container that provides a scoring service that supports application specific scoring functions. The scoring service container is initialized in response to a request for a model provided by the scoring service container, at ML serving infrastructure startup, or under similar conditions (Block 301). Once the scoring service is executing, then the base scorer or similar component thereof can send a model identifier to the model loader function (Block 303). This can be responsive to receiving a request for the model identified by the model identifier provided by the routing service. The model load function can receive the model identifier and retrieve the identified model from a model store or similar data store.

The scoring service receives the model object from the model loader upon completion of the load operation (Block 305). The model object can be returned to the base scorer or similar component of the scoring service. The base scorer can then store the model object in model cache or similar location (Block 307). The model cache 307 can be local temporary storage within the scoring service.

The received request or the parameters thereof can then be set to or provided to the scoring function (Block 309). The scoring function applies these parameters to the loaded model (i.e., the retrieved model object), which processes these parameters to generate a scoring response, which is returned to the base scorer (Block 311). The base scorer can then return the scoring response to the requestor via the routing service and/or the MLS gateway (Block 313).

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
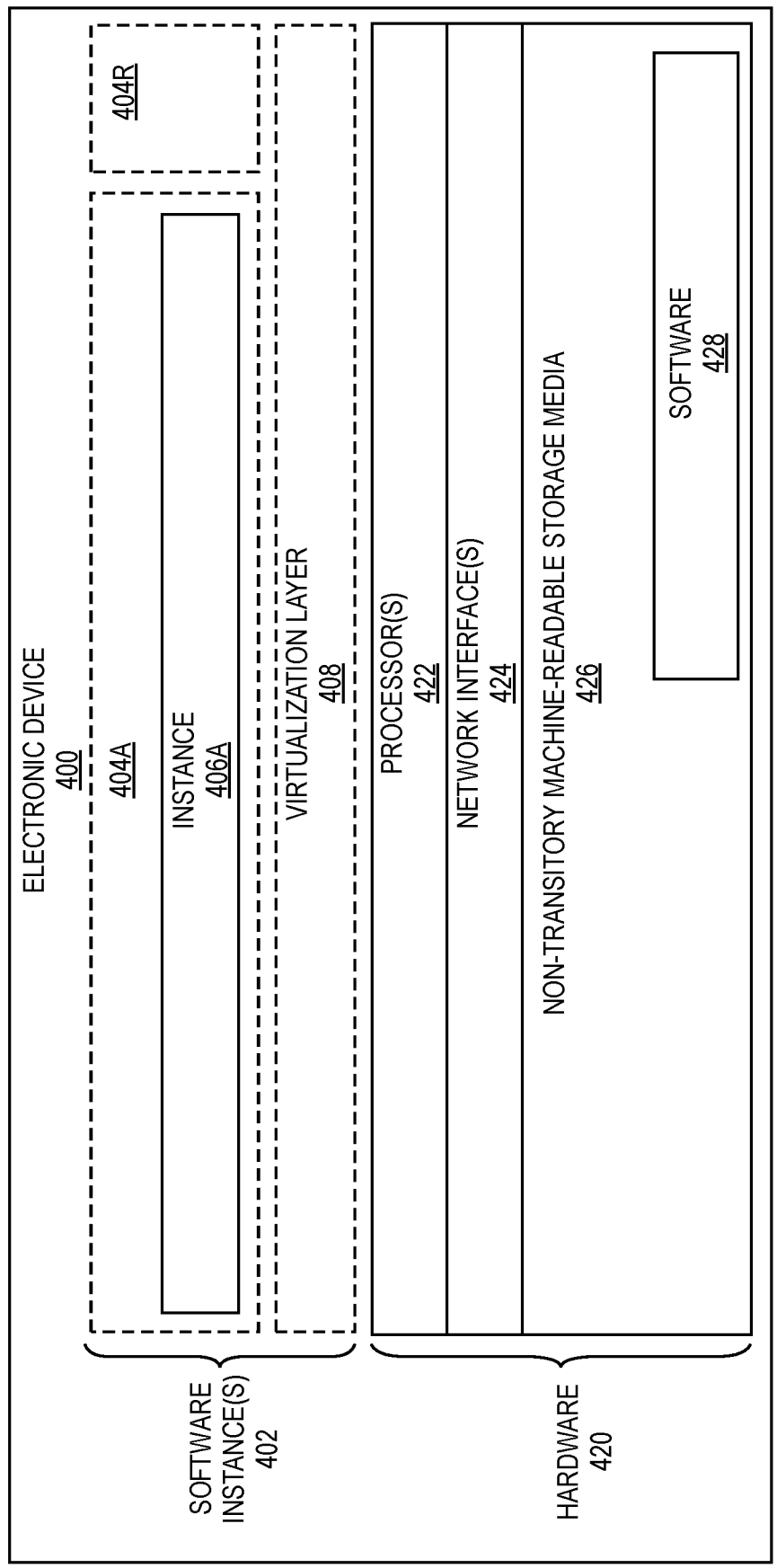
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the ML serving infrastructure may be implemented in one or more electronic devices 400. In one implementation: 1) each of the clients is implemented in a separate one of the electronic devices 400 (e.g., in end user devices where the software 428 represents the software to implement clients to interface directly and/or indirectly with the ML serving infrastructure (e.g., software 428 represents a web browser, a native client, a portal, a command-line interface, and/or an application programming interface (API) based upon protocols such as Simple Object Access Protocol (SOAP), Representational State Transfer (REST), etc.)); 2) the ML serving infrastructure is implemented in a separate set of one or more of the electronic devices 400 (e.g., a set of one or more server devices where the software 428 represents the software to implement the ML serving infrastructure); and 3) in operation, the electronic devices implementing the clients and the ML serving infrastructure would be communicatively coupled (e.g., by a network) and would establish between them (or through one or more other layers and/or or other services) connections for submitting requests to the ML serving infrastructure and returning predictions or scoring to the client applications. Other configurations of electronic devices may be used in other implementations (e.g., an implementation in which the client and the ML serving infrastructure are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
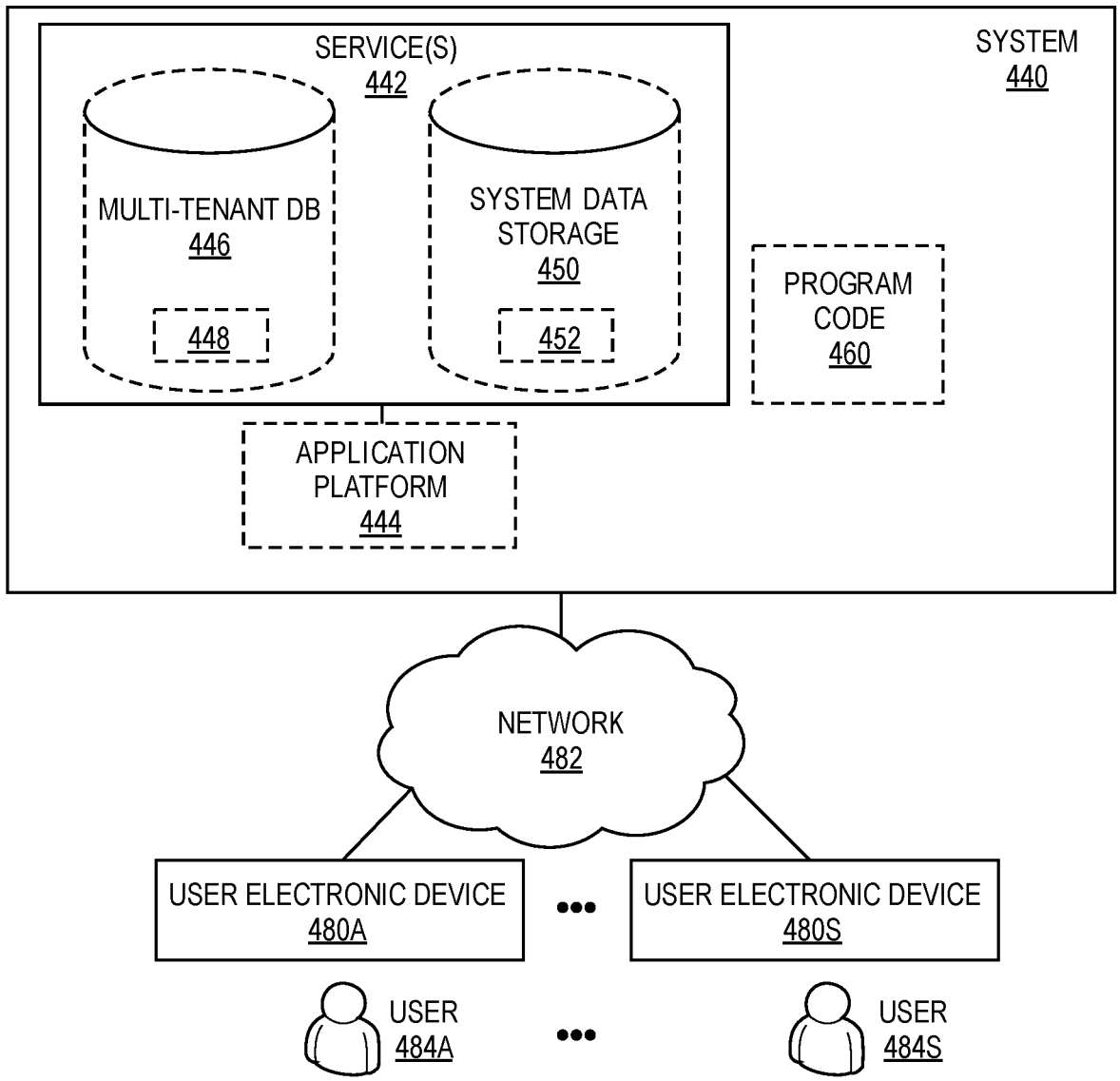
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the ML serving infrastructure. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Prediction Services based on ML; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the ML serving infrastructure, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method in a machine learning serving infrastructure that receives a request from a client application for a scoring, the method comprising:
   receiving, at a base scorer in a scoring service container executed in the machine learning service infrastructure, at least a set of parameters from the request according to a bring your own code (BYOC) application programming interface (API), wherein the BYOC API provides an interface between the machine learning service infrastructure and scoring service containers;
   calling, by the base scorer based on a model identifier, a model loader of an application specific scorer in the scoring service container, wherein the application specific scorer was developed by a machine learning model developer;
   receiving, by the base scorer, a model object from the model loader, wherein the model object is a machine learning model;
   passing, by the base scorer, at least the set of parameters from the request to a scoring function that is also of the application specific scorer and that is to generate the scoring responsive to application of the set of parameters to the machine learning model;
   receiving, by the base scorer, the scoring from the application specific scorer; and
   returning, by the base scorer and according to the BYOC API, the scoring to the machine learning serving infrastructure for delivery to the client application.

2. The method of claim 1,
   wherein the request from the client application includes the model identifier.

3. The method of claim 1, further comprising:
   storing, by the base scorer, the model object in a model cache of the scoring service container.

4. The method of claim 1, further comprising:
generating, by a routing service, a first communication according to the BYOC API that is sent to the base scorer to provide at least the set of parameters from the request to the base scorer; and
generating, by the base scorer, a second communication according to the BYOC API for the returning of the scoring to the machine learning serving infrastructure.

5. The method of claim 1, further comprising:
loading the model object from the model cache in response to subsequent requests identifying the model.

6. The method of claim 1, wherein the scoring service container was implemented by the machine learning model developer using a provided base container that includes the base scorer.

7. The method of claim 1, wherein the application specific scorer and the model are specific for use with the client application.

8. A non-transitory machine-readable storage medium that provides instructions that, if executed by a set of one or more processors, are configurable to cause a system to implement a base scorer to perform operations comprising:
receiving, at the base scorer in a scoring service container executed in a machine learning service infrastructure, at least a set of parameters from a request according to a bring your own code (BYOC) application programming interface (API), where the machine learning serving infrastructure received the request from a client application for a scoring, wherein the BYOC API provides an interface between the machine learning service infrastructure and scoring service containers;
calling, by the base scorer based on a model identifier, a model loader of the application specific scorer in the scoring service container, wherein the application specific scorer was developed by a machine learning model developer;
receiving, by the base scorer, a model object from the model loader, wherein the model object is a machine learning model;
passing, by the base scorer, at least the set of parameters from the request to a scoring function that is also of the application specific scorer and that is to generate the scoring responsive to application of the set of parameters to the machine learning model;
receiving, by the base scorer, the scoring from the application specific scorer; and
returning, by the base scorer and according to the BYOC API, the scoring to the machine learning serving infrastructure for delivery to the client application.

9. The non-transitory machine-readable storage medium of claim 8,
wherein the request from the client application includes the model identifier.

10. The non-transitory machine-readable storage medium of claim 8, wherein the operations further comprise:
storing, by the base scorer, the model object in a model cache of the scoring service container.

11. The non-transitory machine-readable storage medium of claim 8, wherein the operations further comprise:
generating, by a routing service, a first communication according to the BYOC API that is sent to the base scorer to provide at least the set of parameters from the request to the base scorer; and
generating, by the base scorer, a second communication according to the BYOC API for the returning of the scoring to the machine learning serving infrastructure.

12. The non-transitory machine-readable storage medium of claim 8, wherein the operations further comprise:
loading the model object from the model cache in response to subsequent requests identifying the model.

13. The non-transitory machine-readable storage medium of claim 8,
wherein the scoring service container was implemented by the machine learning model developer using a provided base container that includes the base scorer.

14. The non-transitory machine-readable storage medium of claim 8, wherein the application specific scorer and the model are specific for use with the client application.

15. An apparatus comprising:
a set of one or more processors;
a non-transitory machine-readable storage medium that provides instructions that, if executed by the set of one or more processors, are configurable to cause the apparatus to implement a base scorer to perform operations comprising,
receiving, at the base scorer in a scoring service container executed in a machine learning service infrastructure, at least a set of parameters from a request according to a bring your own code (BYOC) application programming interface (API), where the machine learning serving infrastructure received the request from a client application for a scoring, wherein the BYOC API provides an interface between the machine learning service infrastructure and scoring service containers;
calling, by the base scorer based on a model identifier, a model loader of an application specific scorer in the scoring service container, wherein the application specific scorer was developed by a machine learning model developer;
receiving, by the base scorer, a model object from the model loader, wherein the model object is a machine learning model;
passing, by the base scorer, at least the set of parameters from the request to a scoring function that is also in of the application specific scorer and that is to generate the scoring responsive to application of the set of parameters to the machine learning model;
receiving, by the base scorer, the scoring from the application specific scorer; and
returning, by the base scorer and according to the BYOC API, the scoring to the machine learning serving infrastructure for delivery to the client application.

16. The apparatus of claim 15,
wherein the request from the client application includes the model identifier.

17. The apparatus of claim 15, where the operations are further comprising:
storing, by the base scorer, the model object in a model cache of the scoring service container.

18. The apparatus of claim 15, where the operations are further comprising:
generating, by a routing service, a first communication according to the BYOC API that is sent to the base scorer to provide at least the set of parameters from the request to the base scorer; and
generating, by the base scorer, a second communication according to the BYOC API for the returning of the scoring to the machine learning serving infrastructure.

19. The apparatus of claim 15, where the operations are further comprising:
loading the model object from the model cache in response to subsequent requests identifying the model.

20. The apparatus of claim 15, wherein the scoring service container was implemented by the machine learning model developer using a provided base container that includes the base scorer.

21. The apparatus of claim 15, wherein the application specific scorer and the model are specific for use with the client application.

* * * * *